(12) United States Patent
Hettema et al.

(10) Patent No.: US 6,220,171 B1
(45) Date of Patent: Apr. 24, 2001

(54) AMUSEMENT RIDE

(75) Inventors: Philip D. Hettema, Los Angeles, CA (US); Cecil D. Magpuri, Orlando, FL (US); Aidan J. Bradley, Thousand Oaks, CA (US); Kevin T. Parent, Santa Barbara, CA (US); Edward S. Newquist, Universal City, CA (US)

(73) Assignee: Universal City Studios, Universal City, CA (US)

(*) Notice: Subject to any disclaimer, the term of this patent is extended or adjusted under 35 U.S.C. 154(b) by 0 days.

(21) Appl. No.: 09/287,542

(22) Filed: Apr. 6, 1999

(51) Int. Cl.[7] .................................................. A63G 21/10
(52) U.S. Cl. ........................... 104/53; 104/63; 104/75; 104/83; 104/85; 472/59; 472/60; 472/130; 434/34; 434/36; 434/55
(58) Field of Search .................... 104/53, 63, 75, 104/83, 85; 472/59, 60, 130; 434/34, 35, 36, 38, 55

(56) References Cited

U.S. PATENT DOCUMENTS

| | | | |
|---|---|---|---|
| D. 347,674 | 6/1994 | Delaney et al. ................. D21/250 |
| 1,101,630 | 6/1914 | Hopper, Jr. . | |
| 1,448,327 | 3/1923 | Banks . | |
| 1,462,868 | 7/1923 | Newman . | |
| 1,491,238 | 4/1924 | Johnson . | |
| 2,394,523 | 2/1946 | Pancoe ............................ 242/107 |
| 2,661,211 | 12/1953 | Campbell ......................... 272/18 |
| 2,912,244 | 11/1959 | Carr ................................. 272/18 |
| 3,052,432 | 9/1962 | Martin ............................. 244/122 |
| 3,515,074 | 6/1970 | Helbig ............................. 104/28 |
| 3,618,256 | * 11/1971 | Monks ............................. 46/15 |
| 4,303,236 | 12/1981 | Czarnecki ........................ 272/18 |
| 4,402,548 | 9/1983 | Mason ............................. 297/464 |
| 4,503,778 | 3/1985 | Wilson ............................. 104/28 |
| 4,505,472 | * 3/1985 | Lorenc et al. ................... 272/1 C |
| 4,543,886 | 10/1985 | Spieldiener et al. ............. 104/53 |
| 4,700,632 | 10/1987 | Schmutz .......................... 104/63 |
| 4,846,498 | 7/1989 | Föhl ................................. 280/808 |
| 5,031,962 | 7/1991 | Lee .................................. 297/479 |
| 5,115,744 | 5/1992 | Barber ............................. 104/75 |
| 5,137,450 | * 8/1992 | Thomas ........................... 434/44 |
| 5,161,104 | 11/1992 | Fox et al. ........................ 364/410 |
| 5,192,247 | 3/1993 | Barr et al. ....................... 472/60 |
| 5,193,462 | 3/1993 | Marcu ............................. 104/138.1 |
| 5,218,910 | 6/1993 | Mesmer et al. . | |
| 5,433,153 | 7/1995 | Yamada . | |
| 5,453,053 | 9/1995 | Danta et al. .................... 472/29 |
| 5,463,962 | * 11/1995 | Gnezdilov ....................... 104/55 |
| 5,486,141 | * 1/1996 | Ohga et al. ..................... 472/60 |
| 5,507,647 | * 4/1996 | Morris ............................. 434/55 |
| 5,524,928 | 6/1996 | Monagas ......................... 278/248 |
| 5,531,644 | 7/1996 | Marumo .......................... 472/68 |
| 5,580,126 | 12/1996 | Sedlack .......................... 297/256.15 |
| 5,595,121 | * 1/1997 | Elliot et al. ..................... 104/53 |
| 5,669,821 | * 9/1997 | Prather et al. .................. 472/59 |
| 5,711,670 | * 1/1998 | Barr ................................. 434/55 |
| 6,007,338 | * 12/1999 | DiNunzio et al. .............. 434/55 |

* cited by examiner

Primary Examiner—S. Joseph Morano
Assistant Examiner—Frantz F. Jules
(74) Attorney, Agent, or Firm—Lyon & Lyon LLP

(57) ABSTRACT

A roller coaster includes a plurality of ride vehicles that ride along a track. Each vehicle provides seating for at least one passenger. The track is elevated off the ground and includes a variety of hills, curves, loops, rolls, drops, inversions and the like. The vehicles are totally enclosed and preferably designed to represent a space capsule. Sight line controls and a yaw mechanism are used at the load platform to prevent passengers from seeing the other ride vehicles. In addition, the track at the load platform is angled upwards to allow for easy access to the ride vehicles. Portals in the cabin are designed to control sight lines to focus the passengers' attention on show elements that are placed along the track. An on-board audio system enhances the realism of the ride experience. Adjustable restraint systems are provided in each vehicle to keep the passengers in their seats and inside the vehicle during the ride.

54 Claims, 15 Drawing Sheets

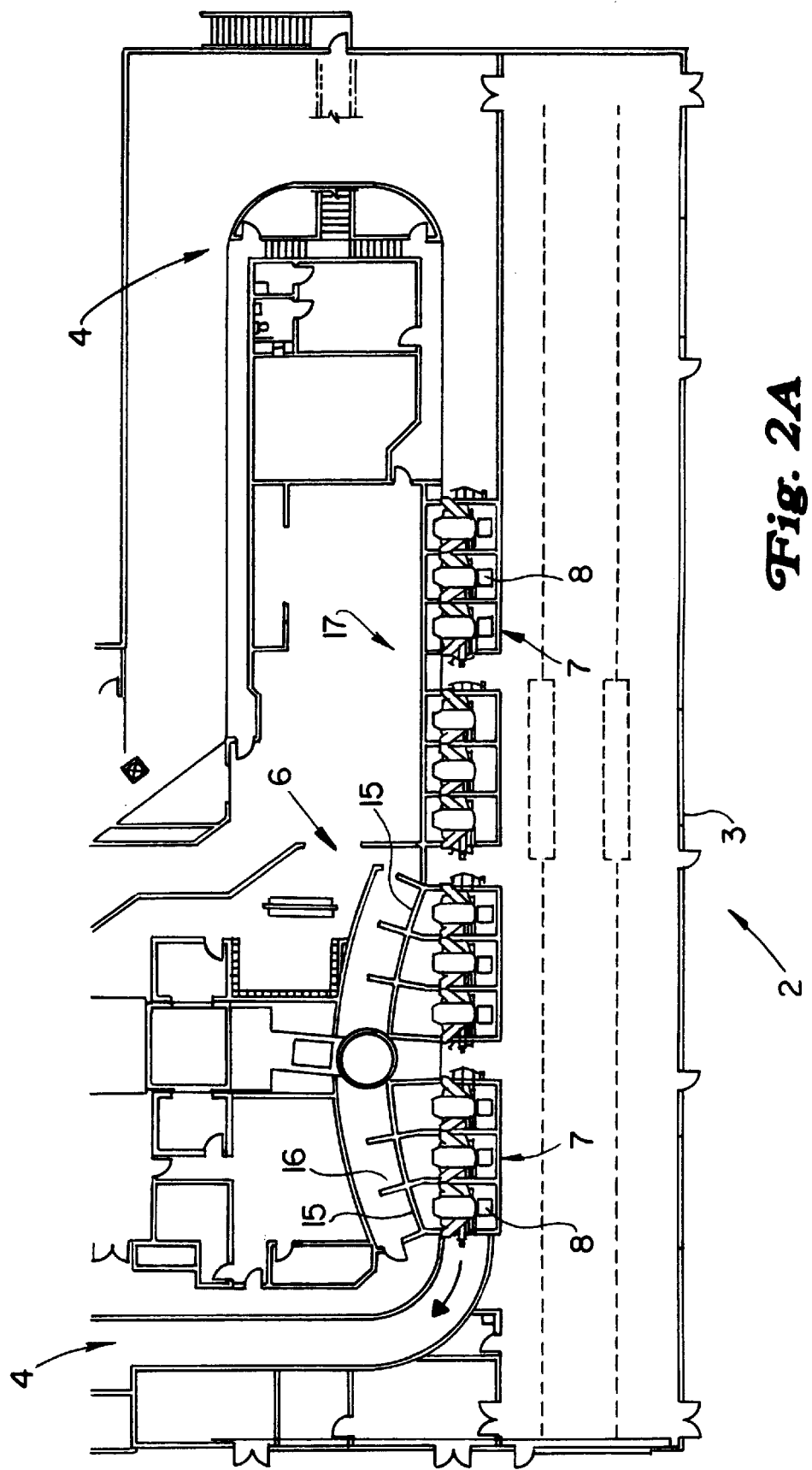

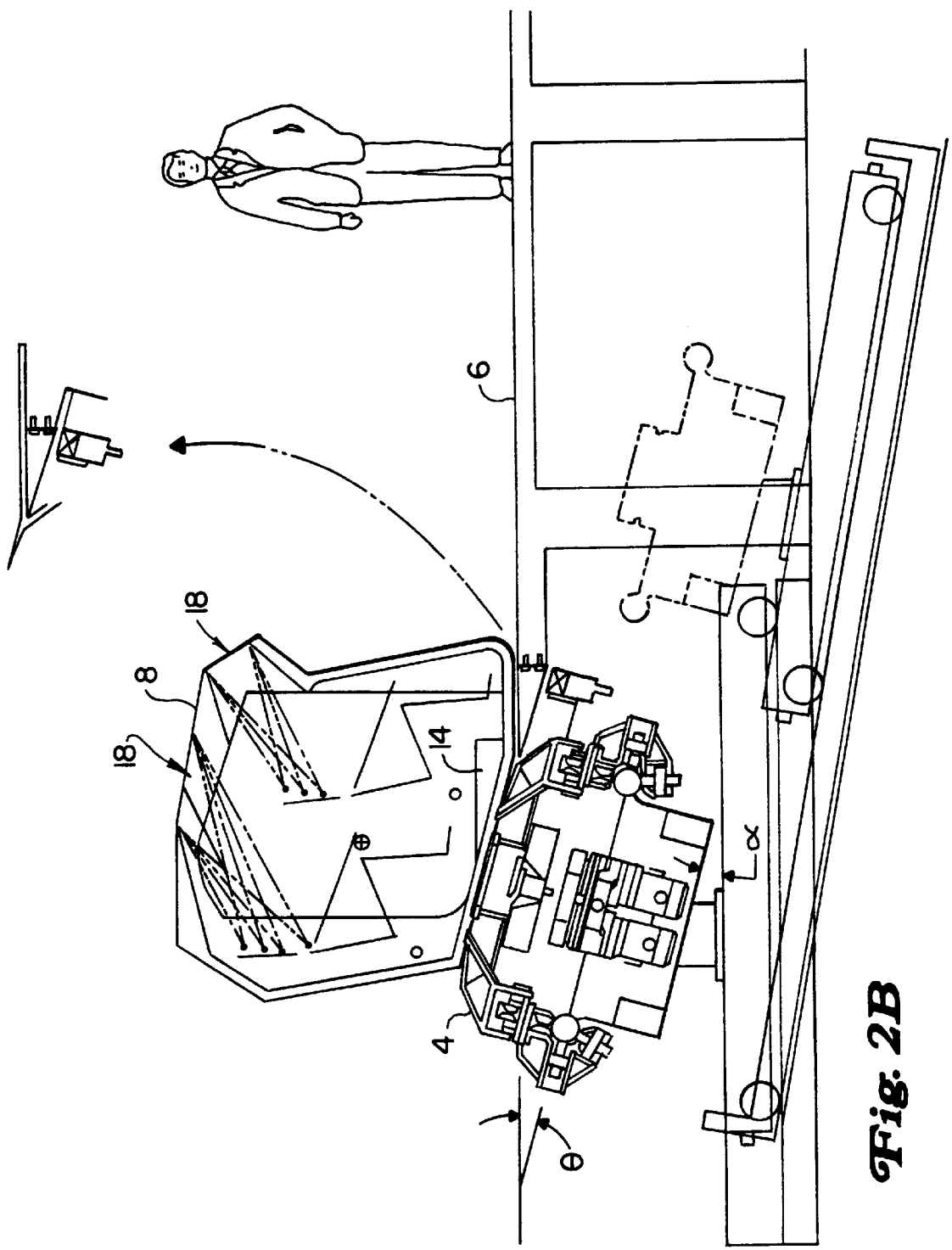

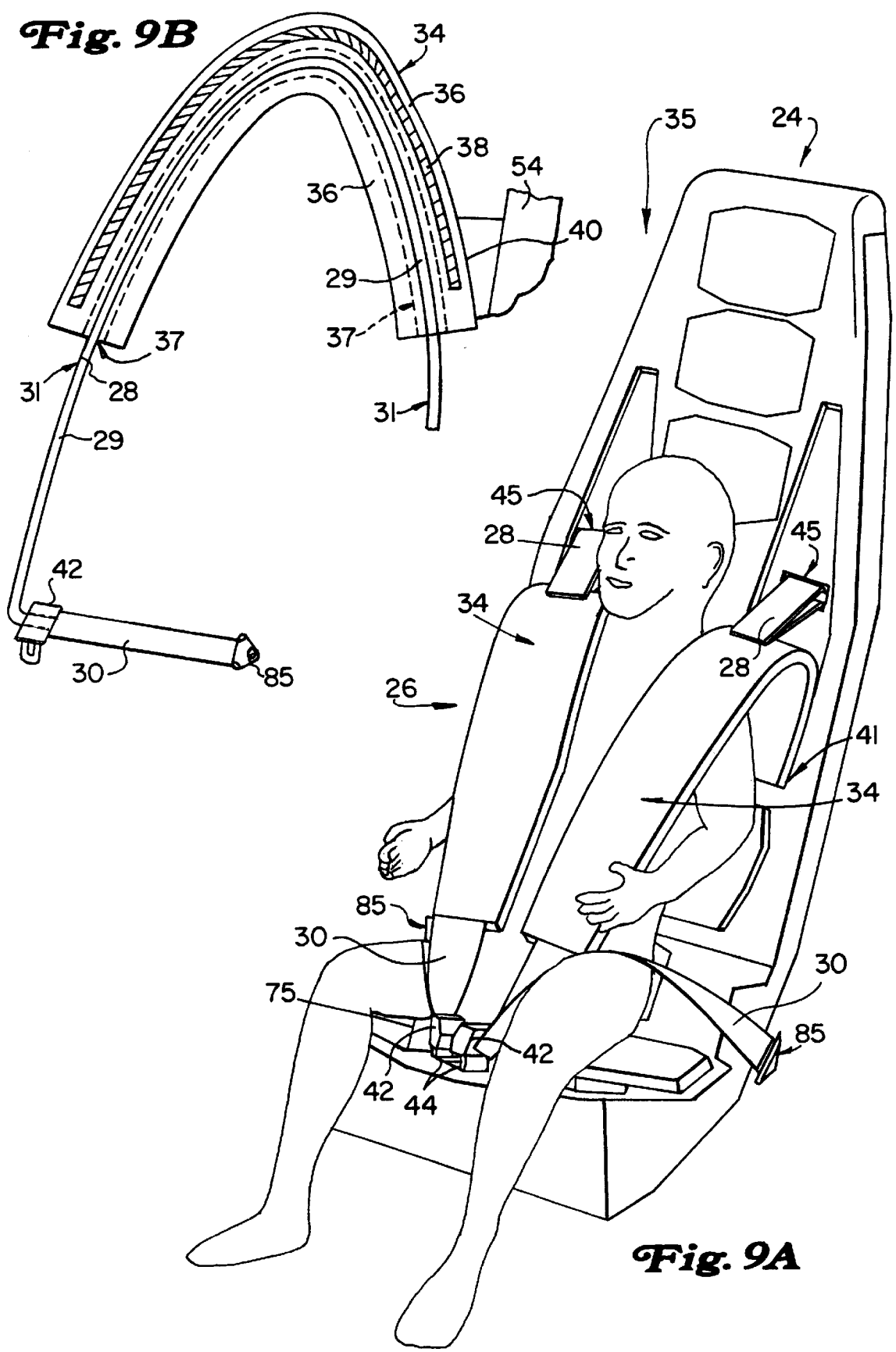

Fig. 12B
Fig. 12A
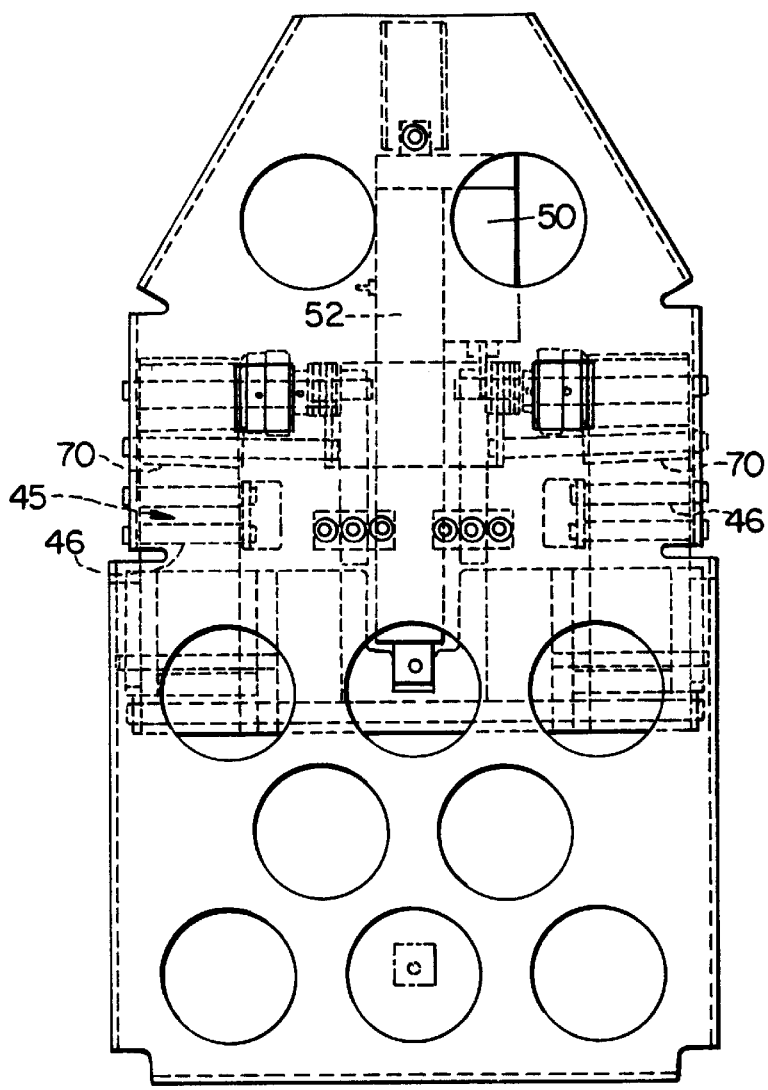
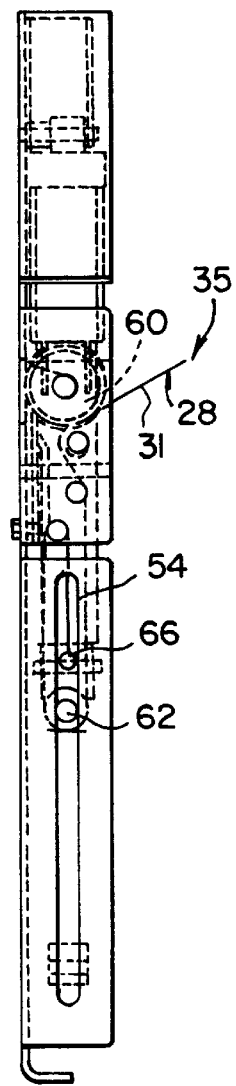
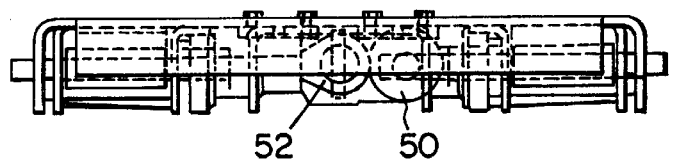
Fig. 12C

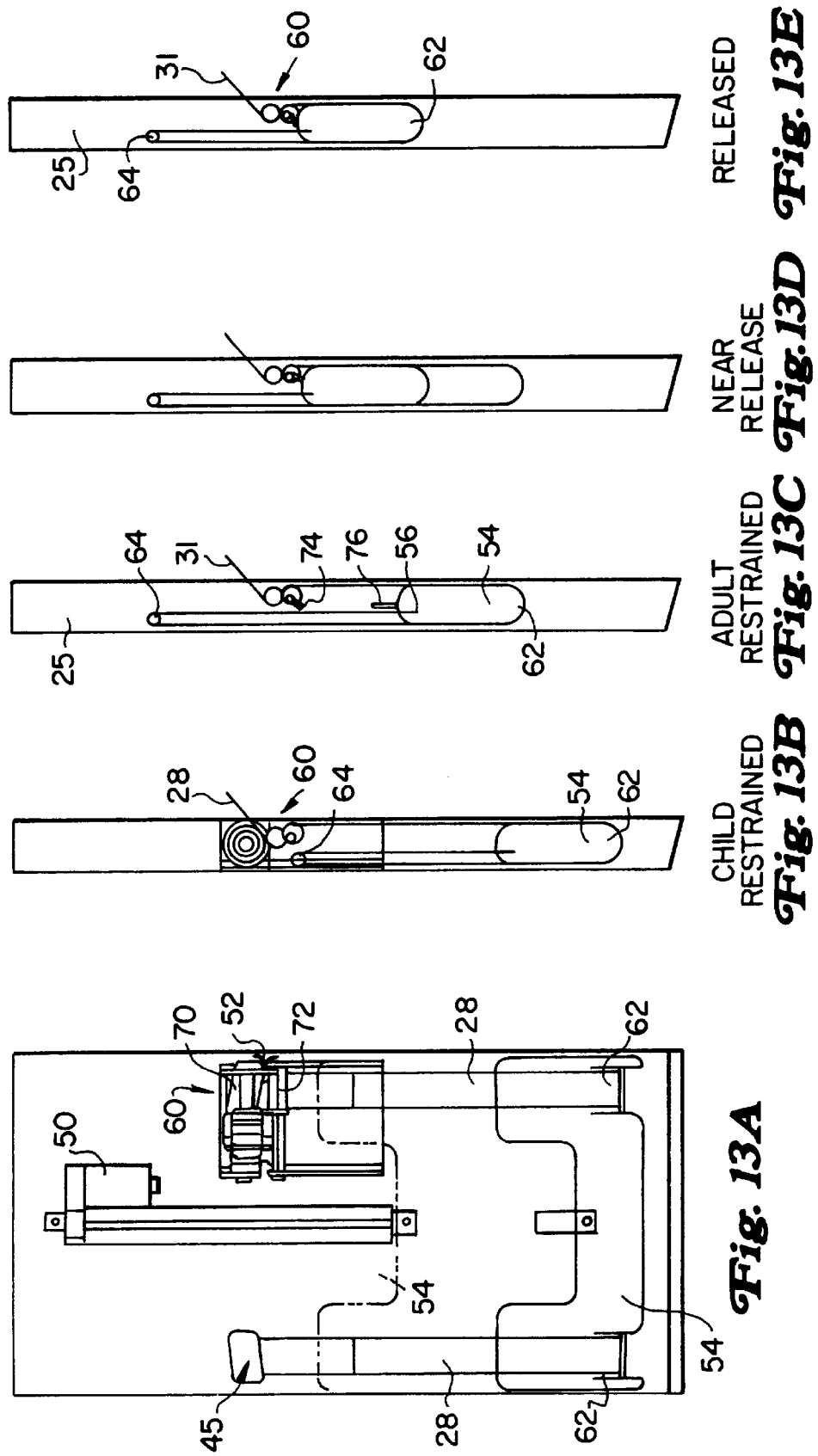

AMUSEMENT RIDE

BACKGROUND OF THE INVENTION

The present invention relates to amusement rides.

Amusement rides, and specifically roller coasters, are very popular at theme and amusement parks around the world. Many amusement rides today have a "theme" which may be related to a motion picture, comic book character, mythical figure, cartoon, etc. A typical roller coaster consists of a number of ride vehicles that are attached to one another and ride along an elevated track. The track usually includes a number of hills, rolls, loops, spirals, inversions, drops and the like. Since most roller coasters are purchased "off the shelf" from a ride vendor, the ride vehicles are mostly standard open-air vehicles with a number of passenger seating positions and safety restraints. The amount of theming applied to roller coasters tends to be minimal, usually limited to the color of the vehicles, the color of the track and some themed elements along the queue line. With a standard, open-air roller coaster vehicle, it is nearly impossible to fully integrate the ride vehicle into the theme of the ride. In addition, when passengers are loading into the ride vehicles, they can generally see other passengers loading into other ride vehicles and they can also see the other ride vehicles during the ride. This detracts from the theme of the ride and diminishes some of the fantasy for the passengers.

Therefore, there is a need for a roller coaster with improved ride vehicles.

SUMMARY OF THE INVENTION

In a first aspect of the invention, a roller coaster or similar ride has enclosed vehicles. Sight line controls may be used to focus the attention of the passengers on specific show elements and to prevent the passengers from seeing other vehicles during the loading procedure. The passengers perceive that they are entering an individual vehicle, when they are actually entering a vehicle in a train of vehicles. The excitement of the ride is therefore enhanced.

In a second separate aspect of the invention, the ride vehicles have the ability to turn or yaw at an angle to the direction of travel. Passengers enter through the front of the vehicle which is turned to face the loading platform. This helps to prevent the passengers from seeing other ride vehicles during loading. The yaw capability may also be used to allow the passengers to view different show elements during the ride.

In a third separate aspect of the invention, portals in the cabin control sight lines to focus the passengers' attention on show elements which are located along the track.

In a fourth separate aspect of the invention, the track alongside the loading platform is rolled towards the platform. This positions the vehicles in a temporarily upright position to ease loading and unloading.

In a fifth separate aspect of the invention, a restraint system has a flexible element which supports itself, to allow quick and simple loading and unloading of passengers, while also accommodating varying sizes of passengers.

In a sixth aspect of the invention, two or more of the separate aspects described above may be combined in an amusement ride.

BRIEF DESCRIPTION OF THE DRAWINGS

In the drawings, wherein the same reference character denotes the same element, throughout all of the views:

FIG. 2A is a plan view of the load platform of the present invention;

FIG. 2B is a side view showing an angled track at the load platform shown in FIG. 1;

FIG. 8A is a perspective view of the cabin interior;

FIG. 9A is a perspective view of the safety restraint of the present invention in use on a small child, with the restraint in its lowest position;

FIG. 9B is a partial section view of the shoulder pad of the restraint shown in FIG. 9A;

FIG. 12A is a side view of the linear actuator used in the safety restraint shown in FIGS. 9A–11;

FIG. 12B is a front view thereof;

FIG. 12C is a plan view thereof,

FIG. 13A is a front schematic view of the passive locking system used in the adjustable safety restraint shown in FIGS. 9A–11; and FIGS. 13B, 13C, 13D and 13E are side schematic views showing alternate positions of the safety restraint.

DETAILED DESCRIPTION OF THE PREFERRED EMBODIMENT

Figure 1:
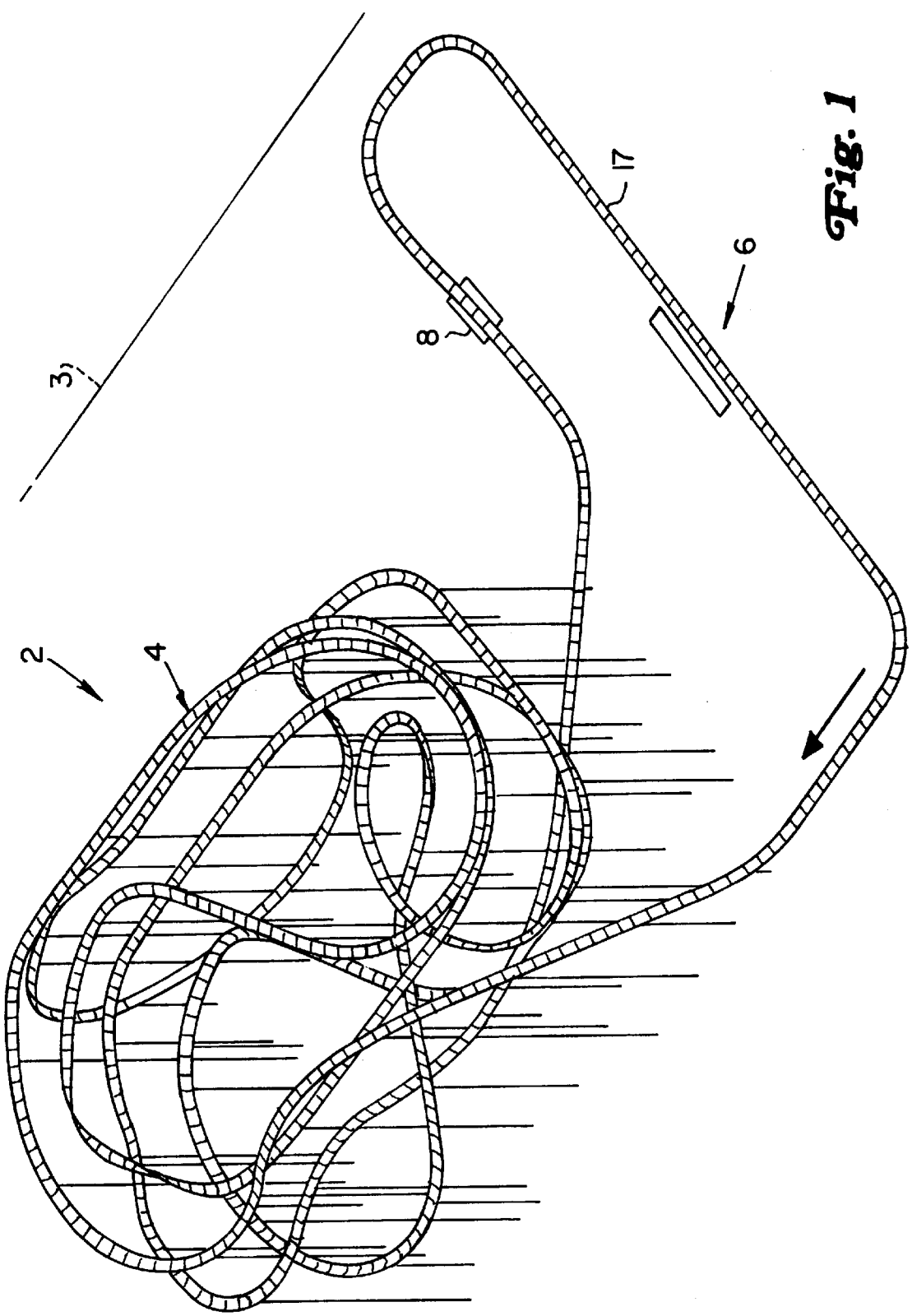
FIG. 1 is a perspective view of a track layout of the roller coaster of the present invention.
Figure 6A:
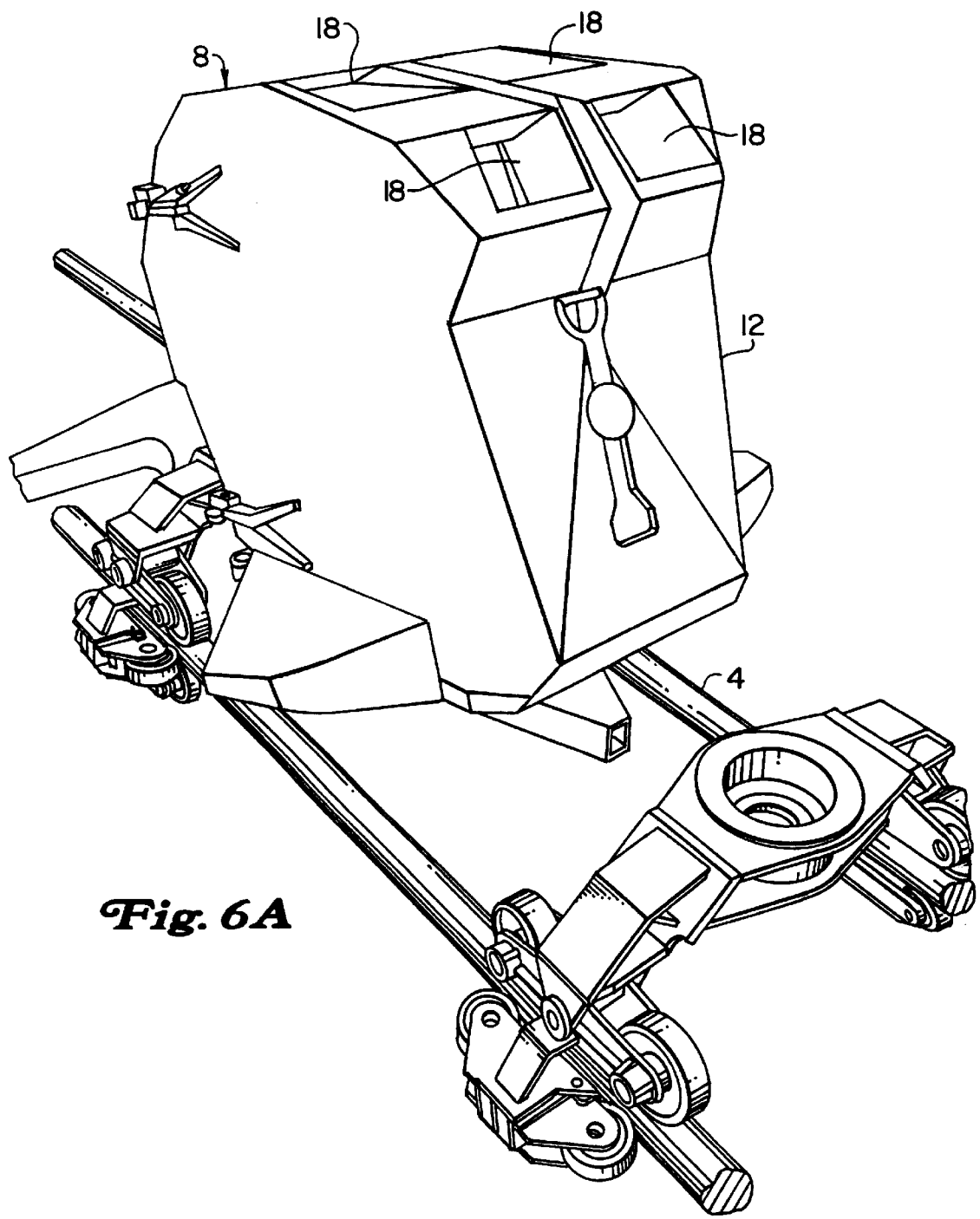
FIG. 6A is a perspective view of the cabin of a single vehicle of the strain of vehicles shown in FIGS. 2A and 3 with the doors closed.

Referring now to FIGS. 1, 2A and 2B, a roller coaster or similar ride 2 has a track 4 and vehicles 8 that travel along the track 4. In the preferred embodiment, the theme of the ride 2 is space travel and the track 4 is elevated and includes numerous hills, curves, loops, rolls, inversions and drops. The track 4 may include sections providing negative "g" forces. The vehicles 8 are advantageously fully enclosed, three-car trains 7 that hold four passengers per car. The track 4, and the entire ride 2, may be enclosed in a building 3 to make a "dark ride". As shown in FIG. 6, the vehicles 8 may be designed to resemble space capsules. Passengers enter the vehicles 8 from a load platform 6. The vehicles 8 roll on the track 4 in a roller coaster-like way, as described, for example, in U.S. Pat. Nos. 5,433,153 and 5,218,910, incorporated herein by reference.

Figure 3:
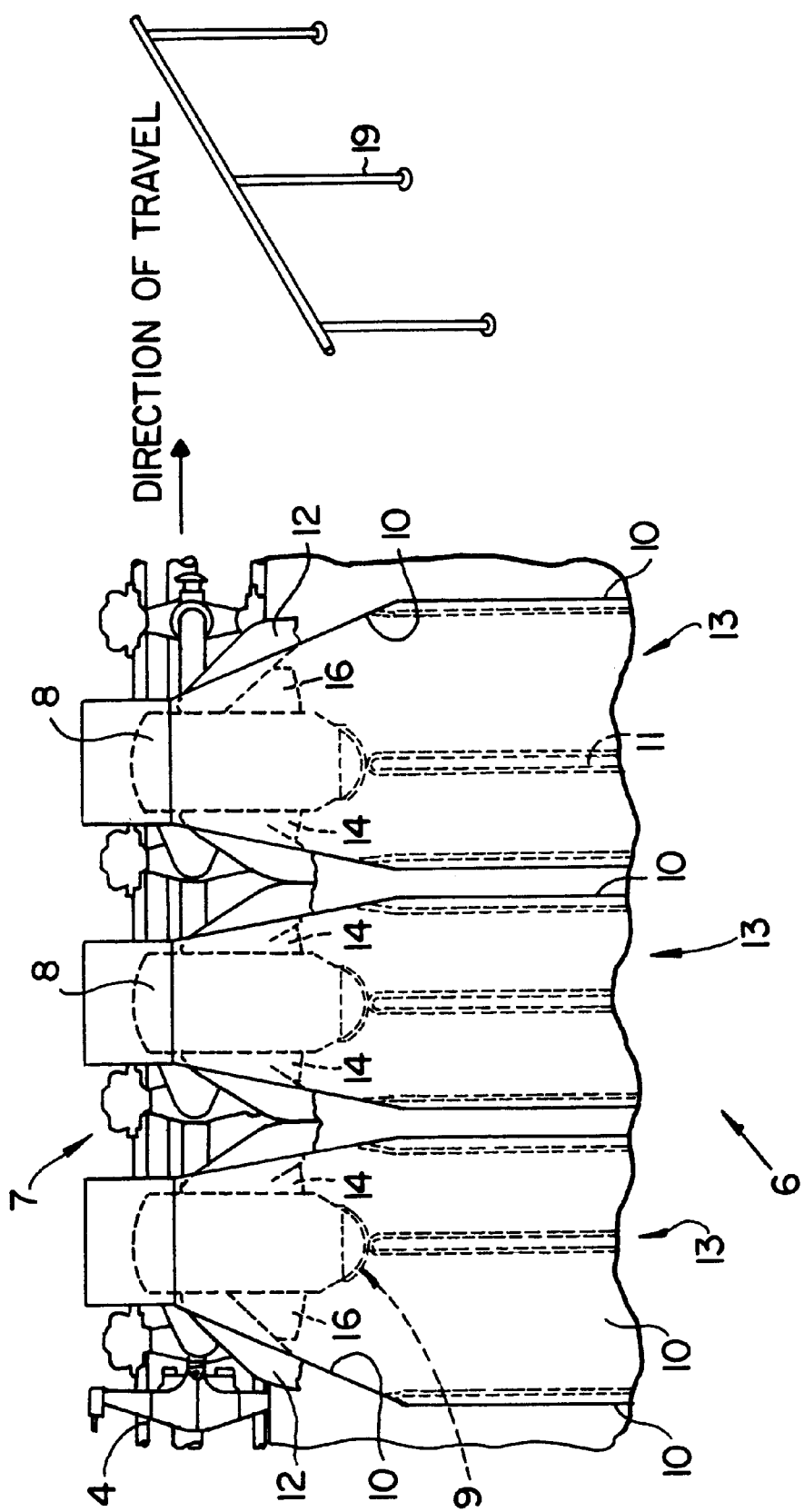
FIG. 3 is a plan view of ride vehicles at the load platform of FIGS. 2A and 2B.
Figure 4:
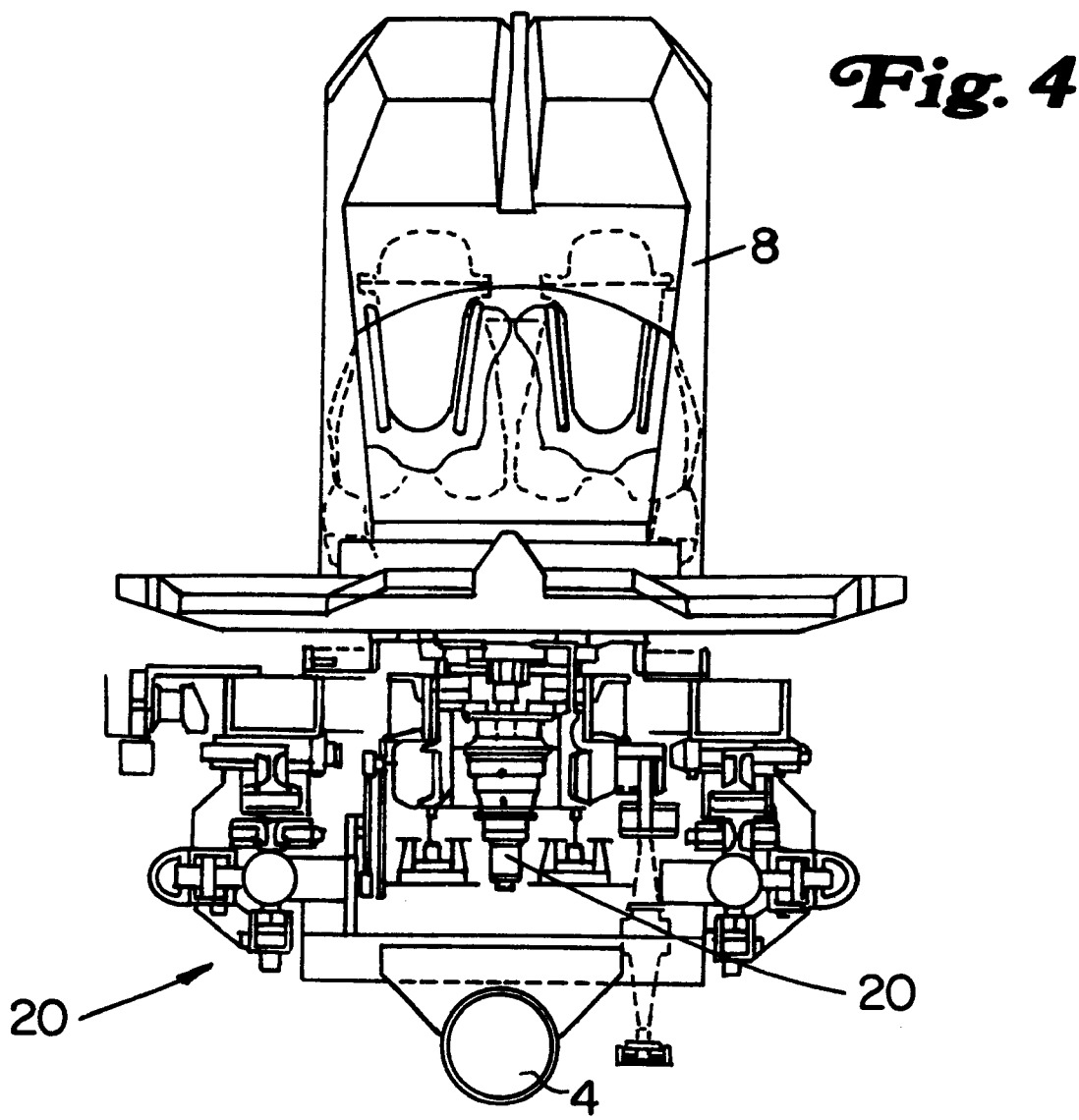
FIG. 4 is a front view of the yaw mechanism of the vehicles shown in FIG. 3.

Referring now to FIG. 2B, FIG. 3 and FIG. 4, loading occurs with the vehicles 8 yawed (via yaw mechanism 20) about 90 degrees from the direction of travel, so that the passengers enter through the front 9 of the vehicle 8. The yaw mechanism 20 allows the vehicle 8 to rotate about its vertical axis. The yaw mechanism 20 is preferably capable of rotating each vehicle 175 degrees clockwise and 180 degrees counterclockwise. The yaw mechanism 20 can be operated by electrical, mechanical or hydraulic means and can be operated independently of movement of the vehicles along the track. A bogey assembly 11 engages the track 4 on three sides: top, bottom and outside. The track 4 is preferably formed with two spaced apart tubular rails 13, which are engaged by the bogey assembly 1.

As shown in FIG. 2B, at the load platform 6, the track 4 is inclined at an upward roll angle θ (preferably about 15°) towards the load platform 6. This allows for easier loading and unloading of the vehicles 8 as the seats are upright and the floor is horizontal during loading. Due to the roll angle of the track at the loading platform, during loading, the normally reclined seats are substantially upright. As the ride begins, and the vehicles move over the nominally flat track, the seats and vehicle roll back to a reclining position. Steps 14 in the vehicles 8 permit the passengers to more easily move into the seats.

As shown in FIG. 3, static sets 10 blend with the similarly themed vehicles. The static sets 10 are located between each vehicle 8 and prevent the passengers from seeing other passengers that are queuing up to enter vehicles 8 beside them. A 19 may be provided at each individual vehicle loading position 13.

Figure 6B:
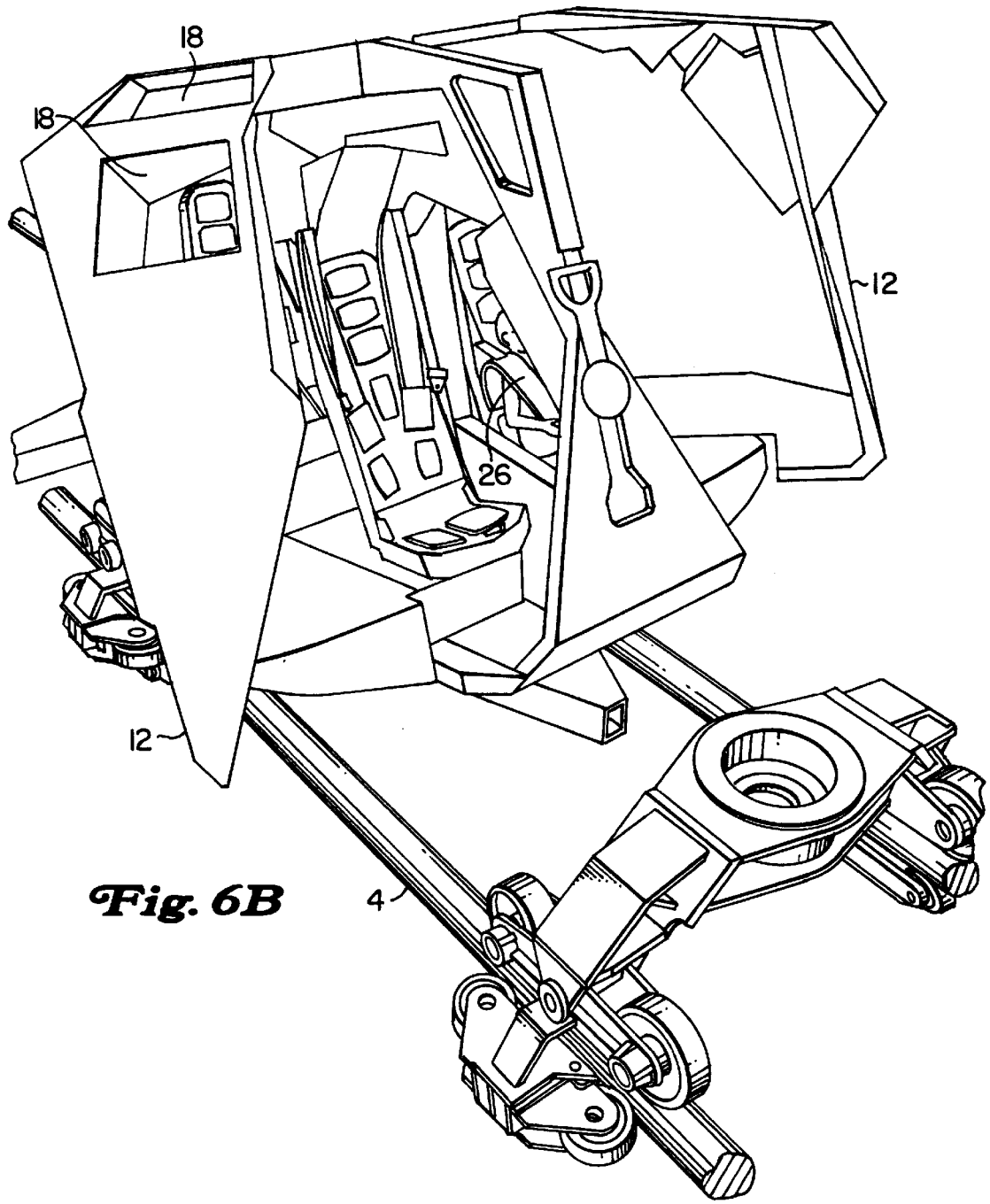
FIG. 6B is a perspective view thereof with the doors open and showing various interior cabin features.
Figure 7C:
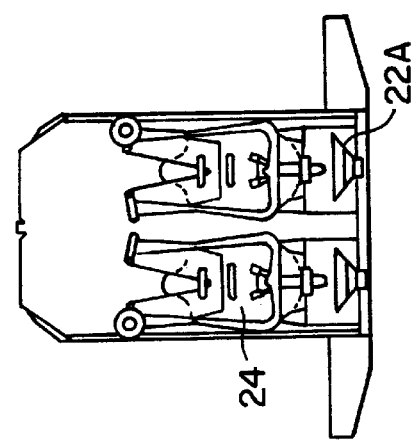
FIG. 7C is a front view thereof.
Figure 7A:
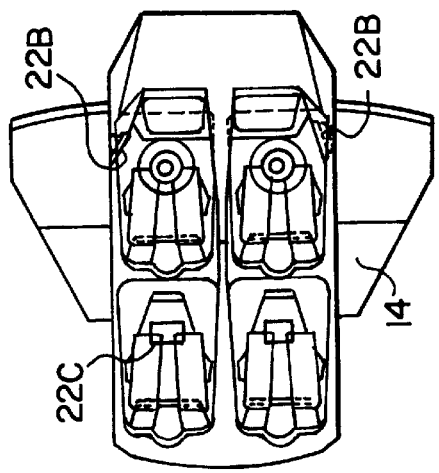
FIG. 7A is a plan view of the cabin.
Figure 7B:
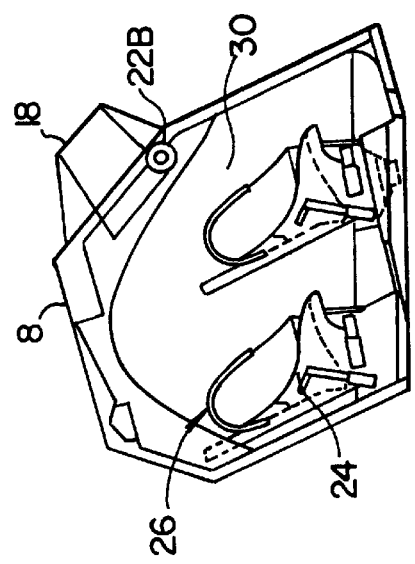
FIG. 7B is a side view thereof.
Figure 8B:
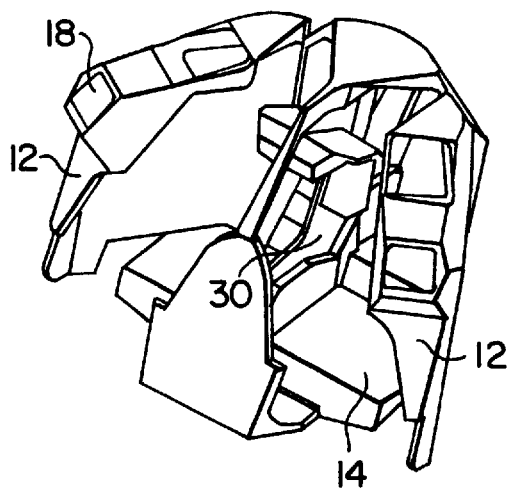
FIG. 8B is an exploded perspective view thereof.
Figure 8B:
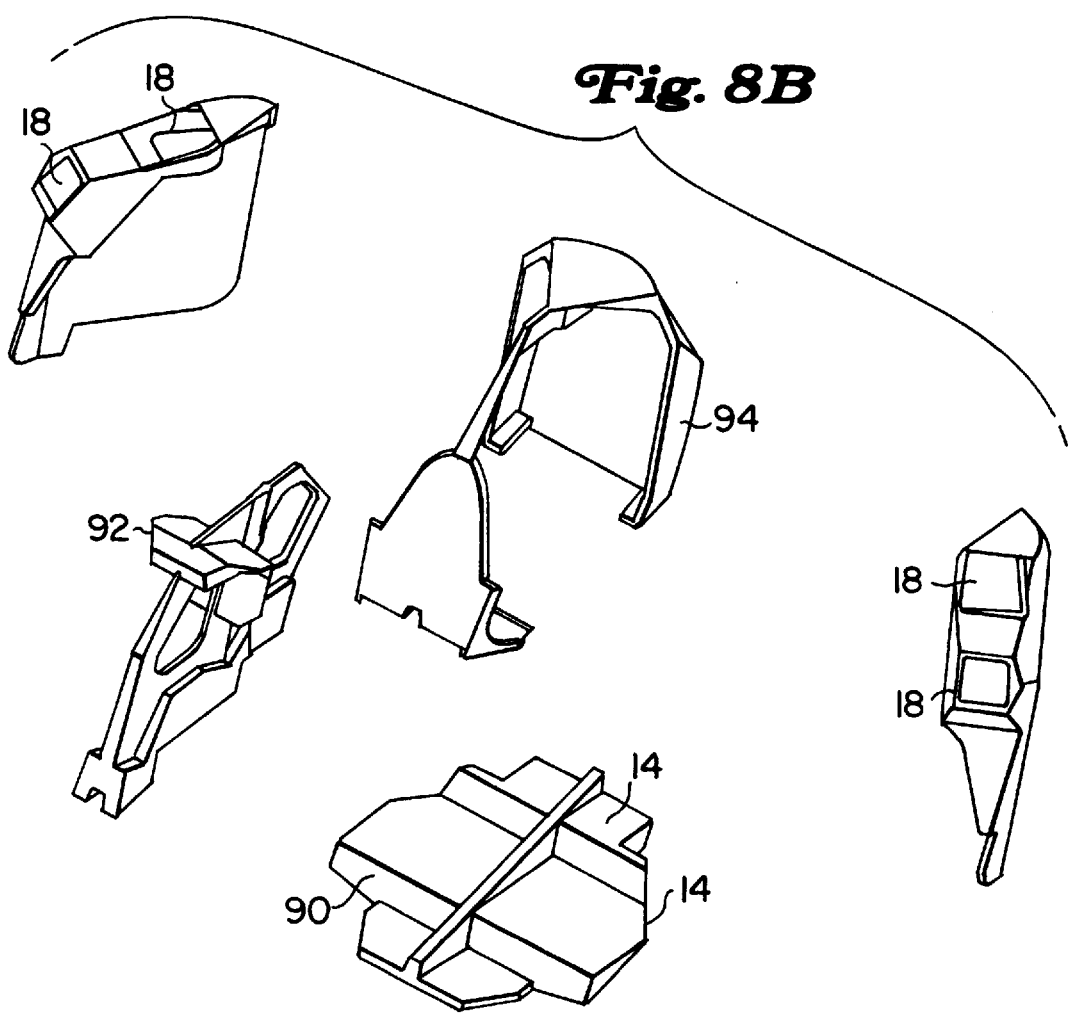

Referring to FIGS. 3, 6B and 8A, each vehicle 8 has a set of integral doors 12, one on either side of the vehicle 8. The doors 12 pivot opened and closed about a vertical axis. Referring momentarily to FIGS. 8A and 8B, the cabin is formed with a floor 90, a central septum wall 92, a core assembly 94 and the left and right side doors 12. The doors close against the septum wall 92, in a clamshell configuration. In some of the vehicles 8, the doors 12 open wider to assist the loading of physically disabled passengers from their wheelchairs to the vehicle 8. When the doors 12 are open, they blend with the static sets 10 to further control the sight lines of the passengers at the load platform 6. The load orientation (that is, the position of the vehicles 8 with respect to the load platform 6) and the static sets 10 help satisfy the creative intent that the vehicles 8 are individual vehicles rather than cars in a roller coaster train. Of course, static sets can also be incorporated into the unload platform 17. A partition or door 15, as shown in FIG. 2A, prevents passengers from entering the loading positions 13 until the train is in position to receive passengers.

Figure 5:
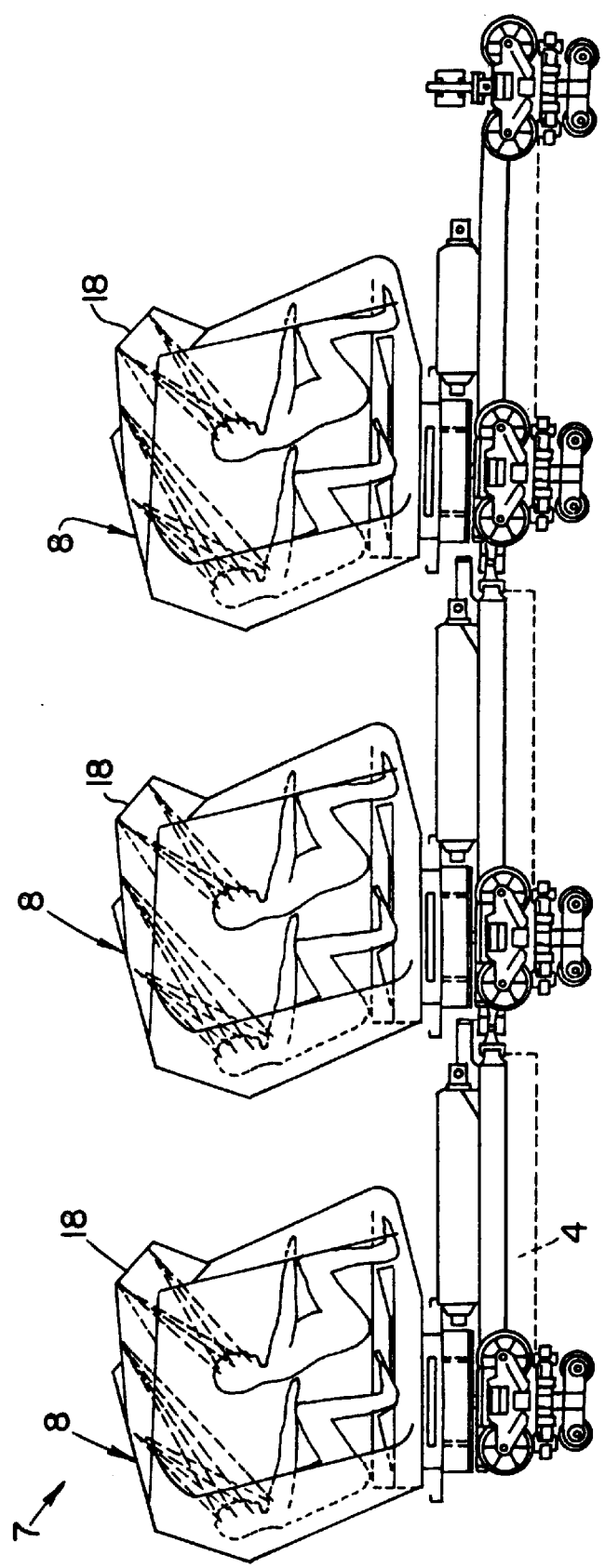
FIG. 5 is a side view of the vehicles.

Referring now to FIG. 5 and FIG. 6, portals 18 in the vehicles 8 control sight lines to focus the passengers' attention on the show elements along the track 4. Since the vehicles 8 are enclosed, the only view that the passengers' have outside of the vehicle is through the portals 18. The yaw mechanism 20 rotates the vehicles 8 throughout the ride according to a pre-determined program. This yaw movement allows the passengers' to view the show elements through the portals 18 and enhances the visual experience of the ride. The scenic design of the ride is also simplified since the passengers field of view is limited, i.e., only the viewable areas of the building containing the ride need to be thematically built out. The portals 18 in the embodiment shown are at the top and front of the doors 12.

Referring now to FIGS. 7A, 7B, 7C and 8A, the interior cabin 30 of the vehicle 8 is also preferably themed to represent a space capsule. On-board audio, lighting and special effects are included to enhance the realism of the experience. The audio system includes two upward facing speakers 22A located under the front two cabin seats 24, two speakers 22B located on the inside panel of both doors 12 and four transducers 22C, one located under each of the four cabin seats 24. The transducers 22C are bass speakers or woofers that will not only provide audio, and also vibrate the seats 24 during the ride to simulate the feel of riding in a space capsule. Power is supplied to the vehicles by a buss bar or other similar method, such as a self-contained battery that is recharged at the station or induction power technology.

Figure 11:
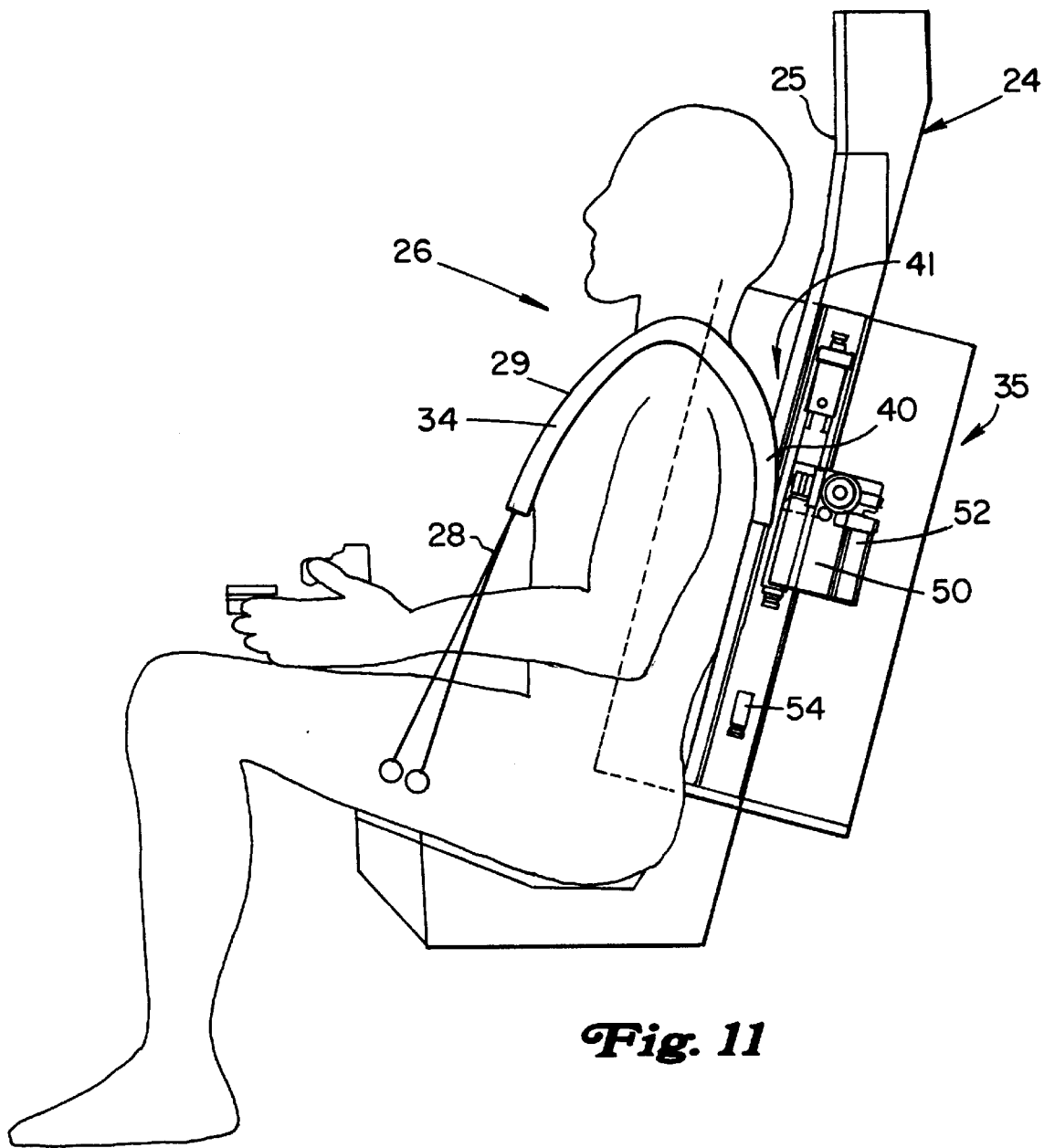
FIG. 11 is a side view thereof.

Referring to FIGS. 9B, 11 and 13C, a safety restraint 26 on each seat 24 has a pair of belts 28 having a shoulder section 29 and a hip section 30. The back end of 31 of each shoulder section 29 of the belt 28 is attached to a retractor 35 behind the back 25 of the seat 24. Each shoulder section 29 of the belt 28 extends upwardly and forwardly through a longitudinal slot 37 in a shoulder pad 34, so that the shoulder section 29 of the belt 28 can slide through the shoulder pad 34. A buckle 42 is slidably attached over each belt 28. Each buckle 42 buckles onto a double latch 44 positioned at the front end of the seat 24, between the passengers legs. Alternatively, a separate latch 44 may be provided for each buckle 44. The sliding buckle 42 is similar to the continuous shoulder belt/buckle/lap belt used in automobiles. The shoulder section 29 is continuous with the hip section 30 of the belt 28. The apex at the buckle geometrically (but not physically) separates or defines the shoulder and hip sections. The left and right side shoulder pads 34 join together at a Y joint section 40 behind the passenger. The Y-joint section 40 extends through a shoulder pad slot 41 in the seat back and is attached to a movable armature 54 which is part of the retractor 35.

The shoulder pads 34 have padding material 36 surrounding a flat spring 38. The flat spring 38 urges the shoulder pads 34 and shoulder sections 29 of the belts 28 upwardly, with sufficient force to hold them up and open, as shown in FIG. 10.

Referring to FIGS. 11, 12A–12C, and 13A, the retractor 35 includes an electric motor 50 linked to a worm drive linear actuator 52. The lower end of the worm drive is attached to and drives an armature 54. The back ends 31 of the belts 28 extend through belt slots 45 in the seat back 25, around a passive tensioner 60, around a dynamic pulley 62 rotatably mounted on the armature 54, over a fixed pulley 64 on the seat back 25, and then to a fixed anchor point 66.

The passive tensioner 60 has a cam wheel 70 which clamps the belts 28 against a fixed idler 72. A cam release 74 on the armature 54 releases the cam wheel 70 when the armature is in the full up position, i.e., when the safety restraint 26 is released.

Figure 10:
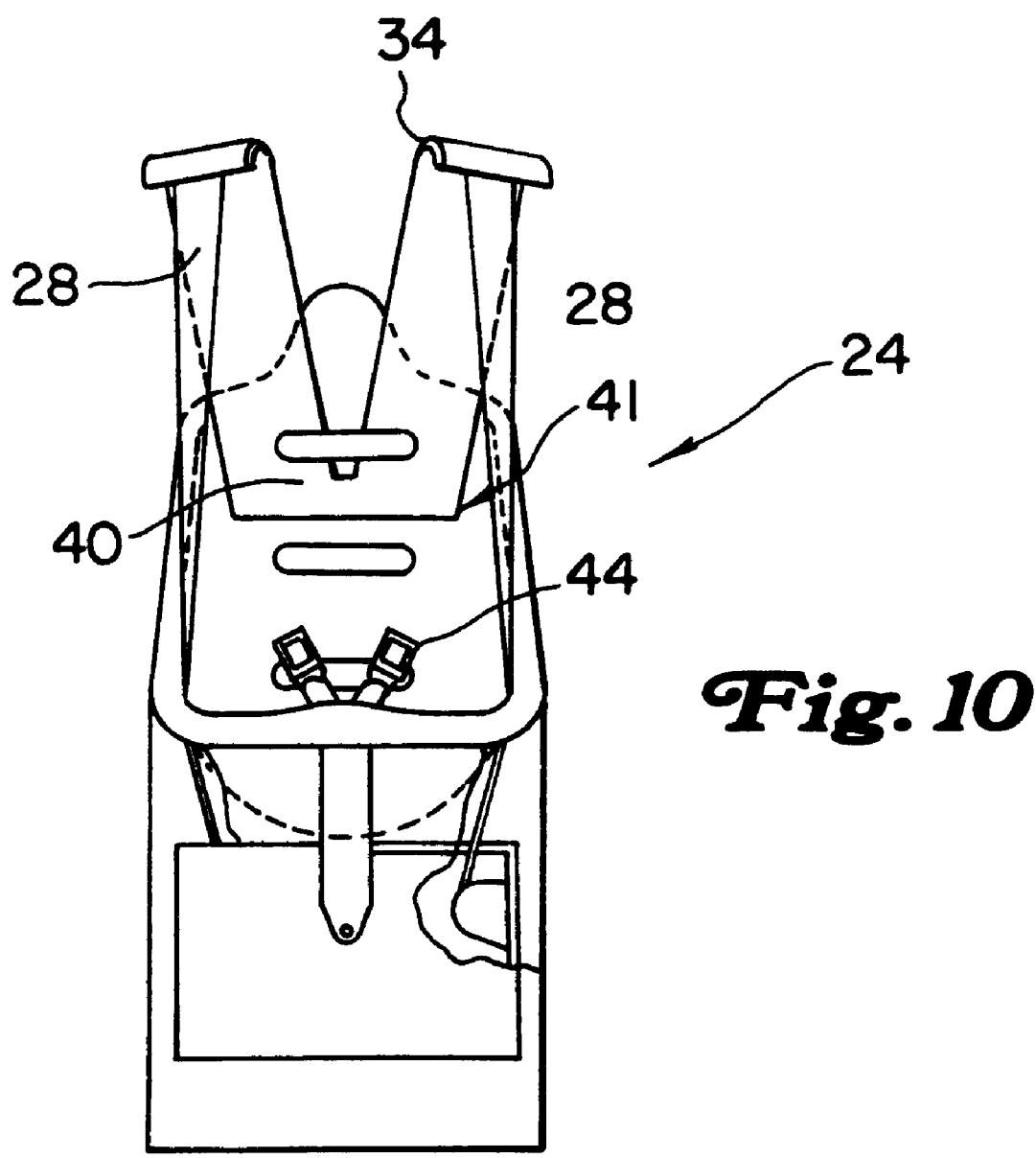
FIG. 10 is a front view thereof.

In use, as passengers enter the vehicles, the armature 54 of the retractor 32 and the safety restraints 26 are in full up position, as shown in FIG. 10. The flat springs 38, which may be steel or a composite spring material, make the safety restraint 26 self supporting, in the form of "rabbit ears". While the spring 38 is sufficiently rigid to hold up and support the safety restraint 26 it is also sufficiently flexible to allow it to conform to varying passenger sizes and shapes. As the safety restraint 26 is self supporting via the springs 38, the safety restraint 26, and specifically, the belts 28 are held up and off of the seat 24, preventing the passengers from sitting on the belts. The buckles, having slid down on the belts 28 are against a buckle stop on belt 28, near the seat bottom. As the restraint 26 is held up and open, passengers can easily slip their arms through the shoulder belts 28. The upright or suspended restraint 26 also provides passengers with a good visual understanding of the operation of the restraint. This allows the passengers to quickly and simply position themselves within the restraint.

After a passenger is seated in the seat 24, the passenger takes each of the buckles 42 and attaches the buckles 42 to the latches 44, similar to the lap/shoulder belt in an automobile. The belts 28 are then positioned around the passenger, but are not yet tightened. A switch 75 at the latches 44 senses that the latches 44 are latched and that the belts are then ready to be tightened. The motor 50 is then turned on driving the worm drive 52 to cause the armature 54 to move downwardly. As this occurs, the belts 28 (preferably made of an automotive seat belt type of material), are withdrawn into the seat back, thereby tightening both the left and right side shoulder belts 28 and lap belts 30. The shoulder pads move down with the armature 54 onto the passengers shoulders and torso. The armature 54 continues to move down until a preset tension is reached on the shoulder belts 28. The motor 50 then turns off. As the shoulder pads are flexible, they by themselves, do not secure the passenger into the seat. The shoulder pads cushion the belts 28, while the belts securely restrain the passenger. While the restraint 26 could work without the shoulder pads, the shoulder pads make restraint more comfortable to use; help to appropriately position belts around the passenger; and hold the belts up off of the seat during loading and unloading.

As an alternative to the switch 75 initiated system described above, the ride operator can press a button at a control station to tighten the belts after inspecting the latches. In another alternative, the belts may be tightened automatically when the cabin doors close. Belt tightening may also be initiated by other events as well.

The worm drive 52 is self locking, so that regardless of the force exerted on the belts 28 during the ride, the armature 54 cannot be moved upwardly to loosen the belts, until the worm drive 52 is positively driven in reverse by the motor 50. Consequently, the belts 28 are secured in a tightened condition, even during failure conditions of the retractor 32. The cam wheel 72 locking the belts 28 against the fixed idler 72 provides a secondary brake or lock on the belts, to prevent inadvertent loosening.

As shown in FIGS. 9A and 13B–E, the armature 54 will travel downwardly further on the seat back to appropriately tension the belts on a small child, than for an adult.

As the shoulder section 29 of the belts 28 extending through the shoulder pads 34 is continuous with the hip section 30 (i.e., they are made from a single length of belt material) when the retractor 32 retracts the shoulder sections and the hip sections of the belts 28 are simultaneously appropriately tightened, to provide a 5 point restraint (with the two adjoining latch points 44 considered as a single point). The hip sections 30 help to prevent lateral movement of the passenger. FIG. 9A shows the restraint in its lowest position, to restrain a small child. As shown in FIG. 11, with an adult, the passengers shoulders are above the belt slots 45, and the belts 28 extend upwardly out of the slots (rather than downwardly as shown in FIG. 9A). Consequently, with an adult, the shoulder sections 29 of the belts 28 are pulling down on the passengers shoulders. With a small child, as shown in FIG. 9A, the shoulder sections are pulling up and back.

With the belts tightened, the vehicle can be rapidly braked or accelerated, or even inverted, with the passenger remaining safely secured into the seat. An interlock prevents the passenger from releasing the buckles 42 from the latches 44 during the ride.

After the ride, to unload, the interlock is released and the passengers unbuckle the buckles 42. Sensing their release, the switch energizes the motor 50 in reverse. This lifts the armature to its original full up position, thereby loosening the belts 28 and raising the shoulder pads. A cam release driver 76 on the armature releases the cam wheel 70 as the armature moves up, to disengage the passive tensioner 60. The passengers then stand and walk out of the vehicle, with the restraint ready to promptly and safely accommodate the next passenger.

As the vehicles are fully enclosed, the ride can provide sensations to the riders not available in conventional open vehicle roller coasters. As described, sight lines can be advantageously controlled. In addition, the enclosed vehicle, or enclosed cabin can better simulate various events, such as traveling in an aircraft, space ship, submarine, etc. Hence the real acceleration or "g" forces associated with such types of vehicles are created by the movement of the vehicle along the track, as with conventional roller coasters. However, because the cabin is enclosed, in contrast to conventional coasters having open cabins, the ride experience is improved.

The invention is susceptible to various modifications and alternative forms. Preferred specific examples have been shown in the drawings and are described in detail. It should be understood, however, that the invention is not limited to the particular forms or methods disclosed. For example, the ride vehicle could be designed to represent any type of vehicle, not just a space capsule. Thus, the invention is intended to cover all modifications, equivalents and alternatives falling within the spirit and scope of the claims.

What is claimed is:

1. A roller coaster comprising:

a track;

a ride vehicle moveable along the track;

a load platform for loading at least one passenger onto the ride vehicle; and sight line controls for controlling the line of sight of the at least one passenger, whereby the sight line controls include a yaw mechanism for turning the ride vehicle in a yaw direction at the load platform.

2. The roller coaster of claim 1, whereby the ride vehicle is enclosed on all sides.

3. The roller coaster of claim 1 with the sight line controls including portals in the vehicle.

4. The roller coaster of claim 1 further comprising an on-board audio system in the ride vehicle.

5. The roller coaster of claim 1, whereby the vehicle has five point restraint system to secure the at least one passenger in the vehicle during the ride.

6. The roller coaster of claim 1 with the sight line controls further including at least one static set on the load platform for controlling sight lines.

7. The roller coaster of claim 1 further including integral doors and steps in the ride vehicle.

8. The roller coaster of claim 1 where the track is angled up towards the load platform.

9. A roller coaster comprising:

a track;

a ride vehicle moveable along the track;

a load platform for loading at least one passenger onto the ride vehicle; and at least one static set for controlling the line of sight of the at least one passenger, at the load platform.

10. The roller coaster of claim 9 where the ride vehicle is enclosed.

11. The roller coaster of claim 9 further comprising an on-board audio system in the ride vehicle.

12. The roller coaster of claim 9 further including a five point restraint system to secure the at least one passenger in the vehicle during the ride.

13. The roller coaster of claim 9 further including a yaw mechanism for turning the ride vehicle in a yaw direction at the load platform.

14. The roller coaster of claim 9 with the sight line controls including portals in the vehicle.

15. The roller coaster of claim 9 further including integral doors and steps in the ride vehicle.

16. The roller coaster of claim 9 where the track is angled up towards the load platform.

17. A roller coaster comprising:
   a track;
   a ride vehicle moveable along the track, with the ride vehicle enclosed on all sides;
   a load platform for loading at least one passenger onto the ride vehicle; and
   portals in the enclosed ride vehicle for controlling the line of sight of the at least one passenger.

18. The roller coaster of claim 17 further comprising static sets at the load platform for controlling sight lines.

19. The roller coaster of claim 17 further comprising an on-board audio system in the ride vehicle.

20. The roller coaster of claim 17 with the vehicle having a five-point restraint system to secure the at least one passenger in the vehicle during the ride.

21. The roller coaster of claim 17 further including integral doors and steps in the ride vehicle.

22. The roller coaster of claim 17 where the track is angled up towards the load platform.

23. A roller coaster comprising:
   a track;
   a ride vehicle moveable along the track;
   a load platform for loading at least one passenger onto the ride vehicle; and
   integral doors and steps in the ride vehicle that allow the at least one passenger to enter the ride vehicle from either side while the ride vehicle is at the load platform.

24. The roller coaster of claim 23, where the ride vehicle is enclosed when the doors are closed.

25. The roller coaster of claim 23 further comprising an on-board audio system in the ride vehicle.

26. The roller coaster of claim 23 further including a five-point restraint system to secure the at least one passenger in the vehicle during the ride.

27. The roller coaster of claim 23 further including a yaw mechanism for turning the ride vehicle in a yaw movement at the load platform.

28. The roller coaster of claim 23 further including static sets at the load platform, for controlling sight lines.

29. The roller coaster of claim 23 further including portals in the ride vehicle for controlling sight lines.

30. A roller coaster comprising:
   a track;
   a ride vehicle moveable along the track;
   a load platform for loading at least one passenger onto the ride vehicle; and
   with the track angled upwards towards the load platform to allow the at least one passenger to more easily board the vehicle.

31. The roller coaster of claim 30, whereby the ride vehicle is enclosed on all sides.

32. The roller coaster of claim 30 further comprising an on-board audio system in the ride vehicle.

33. The roller coaster of claim 30 further including a five-point restrain system to secure the at least one passenger in the vehicle during the ride.

34. The roller coaster of claim 30 further including a yaw mechanism for turning the ride vehicle in a yaw movement at the load platform.

35. The roller coaster of claim 30 further including static sets at the load platform for controlling sight lines.

36. The roller coaster of claim 21 further including portals in the ride vehicle for controlling sight lines.

37. A roller coaster comprising:
   a roller coaster track in an amusement park;
   a chassis having a bogey assembly with wheels engaging the track;
   a yaw axis drive on the chassis for moving a cabin in a yaw direction independent of movement of the roller coaster on the track;
   a door in the cabin to allow a rider to enter and exit the cabin; and
   a rider position in the cabin, enclosed all around by the cabin, when the door is closed.

38. A roller coaster of claim 37 further including a load platform for loading at least one passenger into the cabin.

39. The roller coaster of claim 38, further including static sets at the load platform for controlling sight lines.

40. The roller coaster of claim 39 further including portals in the ride vehicle for controlling sight lines.

41. A roller coaster comprising:
   a roller coaster track in an amusement park;
   a building enclosing the roller coaster track;
   a chassis having a bogey assembly with wheels engaging the track;
   a cabin on the chassis;
   a door in the cabin to allow a rider to enter and exit the cabin; and
   a rider position in the cabin, enclosed all around by the cabin, when the door is closed.

42. The roller coaster of claim 41 further comprising supports along the length of the track to elevate the track to provide at least one of a vertical loop, a hill, a roll, a spiral, an inversion, a drop, and a combination thereof.

43. The roller coaster of claim 42 further including a load platform adjacent to a section of the roller coaster track, and at least one static set on the load platform.

44. The roller coaster of claim 41 further including a yaw mechanism for turning the ride vehicle in a yaw direction.

45. The roller coaster of claim 41 where the track is angled up towards the load platform.

46. A roller coaster comprising:
   a roller coaster track in an amusement park;
   a chassis having a bogey assembly with wheels engaging the track;
   a cabin on the chassis;
   a door in the cabin to allow a passenger to enter and exit the cabin;
   a passenger position in the cabin enclosed all around by the cabin, when the door is closed; and
   at least one view port in the cabin, with the at least one view port providing the only line of sight from the passenger position to the environment outside of the cabin.

47. The roller coaster of claim 46 further comprising supports along the length of the track to elevate the track to provide at least one of a vertical loop, a hill, a roll, a spiral, an inversion, a drop, and a combination thereof.

48. The roller coaster of claim 46 further including a yaw mechanism for turning the ride vehicle in a yaw direction at the load platform.

49. The roller coaster of claim 46 where the track is angled up towards the load platform.

50. A roller coaster comprising:

a roller coaster track in an amusement park;

a roller coaster vehicle on the track; and including a cabin with a septum having a front end and a back end, and a pair of doors pivotably attached to the back end of the septum and moveable outwardly away from the septum to open the cabin, to load and unload passengers, and moveable towards each other to engage the septum, to enclose the cabin from the outside environment, during operation of the roller coaster along the track.

51. The roller coaster of claim 50 where the track is angled up towards the load platform.

52. The roller coaster of claim 50 further including a yaw mechanism for turning the ride vehicle in a yaw direction at the load platform.

53. The roller coaster of claim 50 further including portals in the ride vehicle for controlling sight lines.

54. The roller coaster of claim 50 further comprising supports along the length of the track to elevate the track to provide at least one of a vertical loop, a hill, a roll, a spiral, an inversion, a drop, and a combination thereof.

* * * * *